Aug. 19, 1952 W. T. REA 2,607,852

TELEGRAPH REPEATER

Filed Nov. 30, 1949 2 SHEETS—SHEET 1

INVENTOR
W. T. REA
BY John E. Cassidy
ATTORNEY

TELEGRAPH REPEATER

Filed Nov. 30, 1949 2 SHEETS—SHEET 2

INVENTOR
W. T. REA
BY John E. Cassidy
ATTORNEY

Patented Aug. 19, 1952 2,607,852

UNITED STATES PATENT OFFICE 2,607,852

TELEGRAPH REPEATER

Wilton T. Rea, Manhasset, N. Y., assignor to Bell Telephone Laboratories, Incorporated, New York, N. Y., a corporation of New York Application November 30, 1949, Serial No. 130,267

9 Claims. (Cl. 178—70)

This invention relates to an improvement in telegraph repeaters and control circuits. The improvement consists essentially in an arrangement of telegraph repeaters and control circuits such as to facilitate the establishment of either a half-duplex hub repeater concentration or of a full-duplex interconnection, the latter between two lines only.

An object of the invention is to improve telegraph repeaters and a more specific object is to equip a telegraph line with an individual repeater and control circuit so arranged that the line may be connected with a number of other lines similarly equipped into a hub concentration to operate half duplex or may be directly connected to another single line similarly equipped to permit the joined lines to function on a full-duplex basis, and no duplex control lead is required between the point at which the interconnection is made and the control circuit or telegraph repeater to effectuate the conversion between half-duplex and full-duplex operation.

Among the advantages of so arranging telegraph lines are that every line so equipped is available for use in either type of service, which affords more efficient use of the facilities, and further since the lines which are to function in full-duplex connections are each terminated in individual repeater and control circuits they may be interconnected at a service board without the necessity for adjustment in much the same manner as are hub circuits. There are other advantages, for instance it would eliminate the non-uniformity in the cross-connections which would result if control circuits were used only for multilegged circuits, two-legged circuits being direct connected. In addition since the jacks in a hub repeater equipped with a control circuit are inserted in the drop leg on which ordinarily relatively low potentials are required to be impressed, because of the short local drop paths, the jacks in the full duplex circuits equipped with individual repeater and control circuits would be similarly arranged, which would eliminate the necessity for providing special high voltage jacks in the service board for directly-connected two-legged circuits.

A feature of the present invention is a telegraph line equipped with a repeater and control circuit which will permit its employment either as a spoke of a hub circuit concentration or as one of two corresponding terminations for lines which may be joined to afford full-duplex operation. This and other features will become apparent from the following description when read with reference to the associated drawing which shows two preferred forms in which the invention is presently incorporated. It is to be understood, however, that the invention is not so limited but may be incorporated in other embodiments which will readily be suggested by the following to those skilled in the art.

Figures 3, 4:
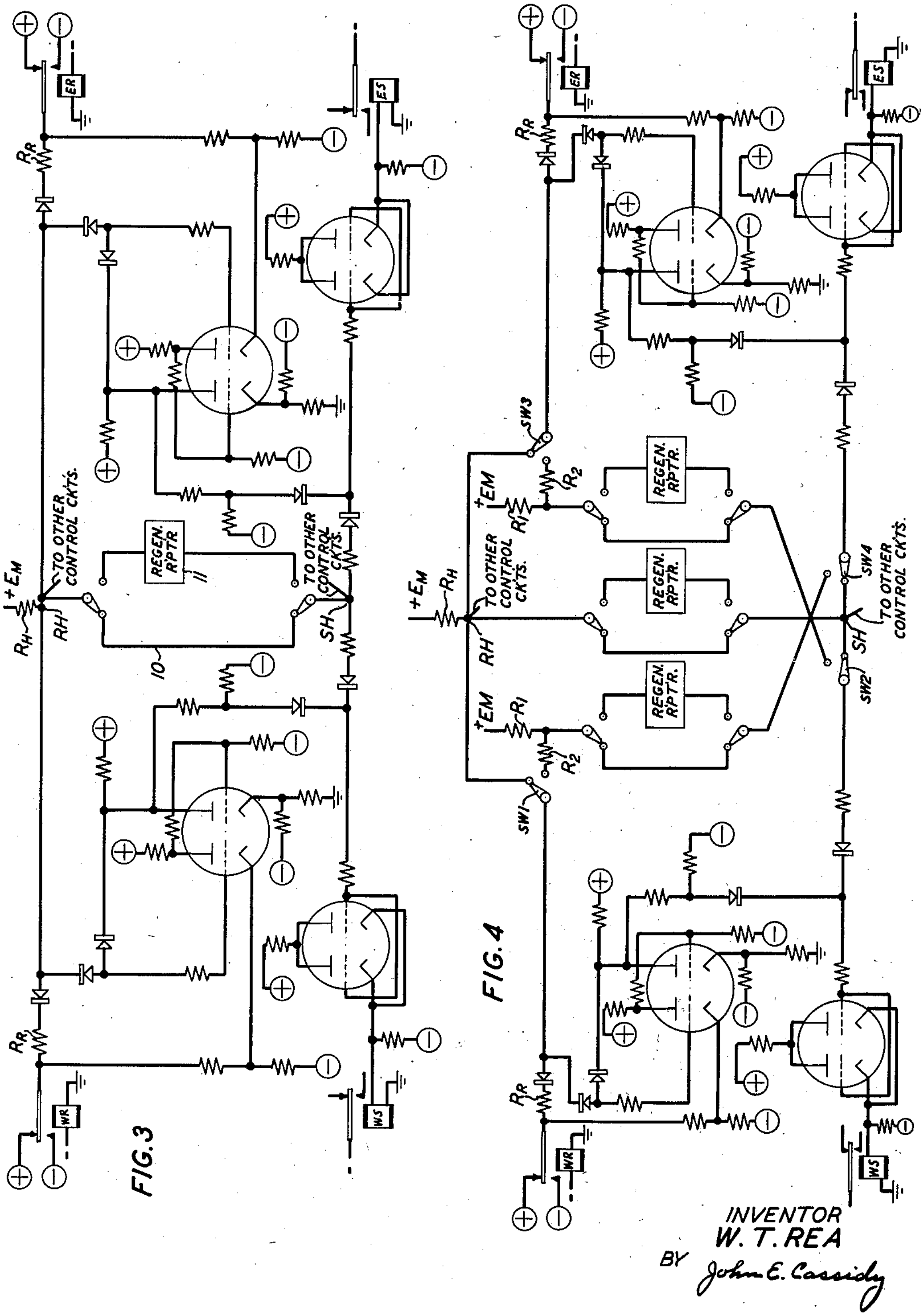

Fig. 3 shows one embodiment of the invention in which two lines are equipped individually with hub-type repeater and control circuits which permit of their interconnection with other lines so equipped to form a hub concentration with or without a regenerative repeater in one form of operation and which permits also of the interconnection of the two lines only to afford full-duplex operation between them in another type of operation when a regenerative repeater is not required in the interconnection between the lines; and Fig. 4 shows another embodiment in which the two lines each equipped with an individual repeater and control circuit may be connected with other lines so equipped to form a hub concentration or the two lines only may be directly connected together to afford a full-duplex connection, in which latter case the two lines so interconnected will function full duplex whether or not regenerative repeaters are interconnected between them.

The arrangement of Fig. 3 is operable with a number of different telegraph repeater electronic control circuits of the space discharge type which circuits include a double-space by-pass feature. Among these circuits are two per Fig. 1 and Fig. 2 herein which have been described in my copending application, Serial No. 56,819 filed October 27, 1948, now Patent No. 2,558,197, either of which is available for the present purpose. The same control circuit and others of the same general type, modified as explained herein may be employed in the arrangement of Fig. 4 herein. The operation of the two control circuits per Fig. 1 and Fig. 2, either of which may be employed in the present arrangement, will first be described.

Figure 1:
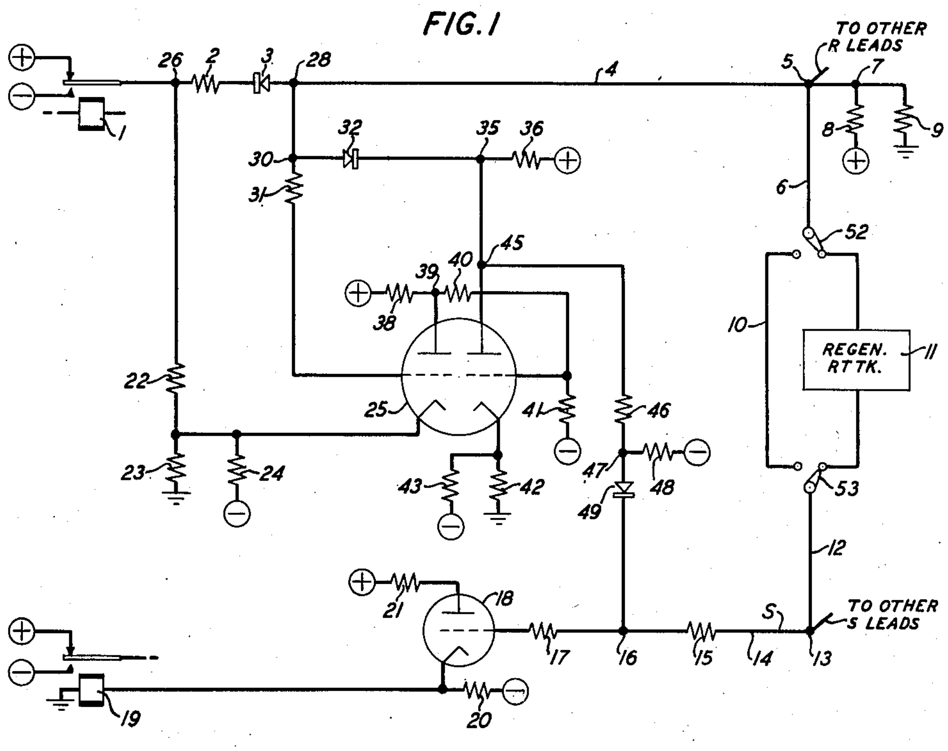
Fig. 1 shows one of a number of repeater and control circuits which control circuit includes a double-space by-pass feature, which may be employed in the arrangement of the present invention per Fig. 3 and with modifications in the arrangement of the present invention per Fig. 4.

Refer now to Fig. 1. Fig. 1 shows at the top a horizontal path which is an individual receiving leg and at the bottom a horizontal path which is an individual sending leg of a single repeater. The individual receiving leg and the individual sending leg are connected at the right through a vertical connection to the junction between two resistances whose outer terminals are connected between battery and ground. Switches 52 and 53 may be operated to engage their right-hand or left-hand contacts depending upon whether the regenerative repeater is or is not to be employed. The vertical connection may be considered to be the common hub. A number of other individual receiving legs and a corresponding number of other sending legs, nine of each, for instance, not shown, may be connected to the common hub. Interconnecting the receiving and sending paths of the single repeater shown is a network of resistances, dry rectifiers and a double-triode vacuum tube arranged in an improved flip-flop control circuit. The function of this interconnecting network is to control transmission between the branches of the network in a manner to be described. Each of the other individual pairs of legs of the repeaters assumed to be connected into the hub circuit concentration, not shown, will be interconnected individually in the same manner by its own individual control circuit. Each receiving relay, such as relay 1 and each sending relay such as relay 19 are associated with a telegraph line or loop.

The network is arranged in such manner that signals incoming to any one of the circuits from its individual receiving leg can be repeated to all of the other circuits simultaneously. The network also includes means whereby signals incoming to a particular circuit from its associated individual receiving leg will not be repeated back over the associated sending leg to the same line. The network includes also arrangements whereby if telegraph signals are being received over a particular receiving leg and simultaneously signals are received from a second receiving leg connected to the hub, said signals will be impressed on all sending legs connected to the hub.

The signals are received from a particular line by means of a receiving relay, such as relay 1, which actuates an armature between its upper or marking contact and lower or spacing contact in response to impulses incoming from its associated line and impressed on its winding. The armature of relay 1 is connected through resistance 2, a dry rectifier 3 and conductor 4 to junction point 5 of hub section 6 which is connected to the junction 7 between resistances 8 and 9 which resistances are connected in series between positive battery and ground. Other receiving conductors similar to conductor 4 extend from junction 5 through similar receiving branches individually to other armatures of other receiving relays similar to relay 1. Section 6 of the hub may be connected alternatively directly through branch 10 or regenerative repeater 11, and then through section 12 of the hub to the sending junction 13, to which all sending legs of all circuits in the hub system are connected. From junction 13 the sending leg of the individual circuit shown extends through conductor 14, resistance 15, junction 16 and resistance 17 to the grid of vacuum tube triode 18. The cathode of triode 18 is connected through the winding of sending relay 19 to ground and through resistance 20 to negative battery in parallel. Positive battery is connected through resistance 21 to the anode of triode 18.

The armature of receiving relay 1 is connected from junction 26 through resistance 22 to parallel branches. One branch extends through resistance 23 to ground. A second branch extends through resistance 24 to negative battery and a third branch to the left-hand cathode of double triode 25. Positive battery is connected through resistance 38 to the left-hand anode of double triode 25. From junction 39 in the anode circuit of the left-hand triode 25 a circuit extends through resistance 40 to parallel branches. One branch connects to the grid of the right-hand triode of tube 25 and a second branch extends through resistance 41 to negative battery. The cathode of the right-hand triode of tube 25 is connected to the junction between grounded resistance 42 and resistance 43 which is connected to negative battery. From junction 28 in receiving leg 4 a path extends through resistance 31 to the grid of the left-hand triode of double triode 25. Junction 30 is connected through dry rectifier 32, terminal 35 and resistance 36 to positive battery. From terminal 35, between dry rectifier 32 and resistance 36, a path extends to the anode of the right-hand triode of tube 25. From junction 45 between resistance 36 and the anode of the right-hand triode of tube 25 a path extends through resistance 46 and dry rectifier 49 to junction 16 between resistances 15 and 17. Negative battery is connected through resistance 48 to junction 47 between resistance 46 and dry rectifier 49.

As mentioned above, a regenerative repeater may be connected between sections 6 and 12 of the hub by actuating switches 52 and 53 to the right as shown. The regenerative repeater may for instance be in accordance with that described in detail in Patent 2,105,173 to Walter J. Zenner et al., January 11, 1938, which patent is made part of the present disclosure as though set forth fully herein. It is pointed out that when a regenerative repeater is used a delay is introduced by the regenerative repeater between the reception of any pulse over one of the receiving legs connected to junction 5 and the retransmission of the pulse over the sending legs, such as leg 14, after regeneration. The delay introduced is approximately equal in duration to one-half the duration of a standard pulse length.

Double-triode tube 25 and its associated connections as mentioned above are arranged herein as an improved flip-flop control circuit. Generally speaking a flip-flop circuit is a vacuum tube circuit which may for instance comprise essentially two individual triodes, or a double triode, having the input and output circuits thereof mutually interconnected, so that when one is conditioned to conduct the other is responsively prevented from conducting and vice versa. The modification in the present circuit consists essentially of the introduction of the dry rectifier 32 into the feedback circuit interconnecting the anode of the right-hand section of the double triode to the grid of the left-hand section. The voltage conditions applied to the circuit including the dry rectifier are such that under one condition the rectifier is effective to open the feedback circuit, so that the voltage condition of the right-hand anode is not effective to control the grid of the left-hand triode. This will be explained more in detail hereinafter.

The individual repeater which is illustrated is shown in the marking condition. All other repeaters, not shown but assumed to be connected into the system, are assumed to be in the same condition. For this condition the armatures of all receiving relays, such as the armature of relay 1, connected to the hub circuit are in engagement with their upper or marking contacts so that they are all connected to positive battery. Positive potential will be applied from the potentiometer comprising resistances 8 and 9 through the hub to the junction 13 of all sending legs, such as 14. If the regenerative repeater is used, it will be assumed that the circuit through it is arranged for the marking condition so as to impress positive potential upon the junction 13. However, the potential actually applied across the input of the left-hand triode of each double triode 25 when the marking condition prevails depends upon the condition of the flip-flop control circuit in each individual repeater. The manner in which this is performed will be described hereinafter. It is pointed out at this time, however, that the flip-flop control circuit is arranged so that for one condition, called the unlocked condition, it exercises no effective influence on its sending leg. If the control circuit in an individual repeater is unlocked, therefore, and a marking or positive potential is applied from the hub through the sending leg, such as conductor 14, to the grid of triode 18, the triode will conduct and the effect of the current flowing through the winding of relay 19 will cause its armature to engage its upper or marking contact. While a spacing signal is impressed on the hub, the hub will be made more negative. The grids of all tubes in unlocked sending legs will be made more negative than their cathodes and these tubes will cease to conduct. Under this condition the armatures of their respective sending relays will be under the influence of negative battery through resistance 20 and the winding of each such sending relay to ground, actuating the armature of each such sending relay to engage with its spacing contact.

Before describing the manner in which the flip-flop control circuit operates in detail to perform the control functions, there will first be presented a general description of the functions it must perform to meet the operating requirements.

Ordinarily, when the system is in operation, only one receiving relay, such as relay 1, in the receiving leg of some individual repeater, will transmit toward the hub at any one time. The flip-flop control circuit individual to each repeater in the concentration, other than the control circuit in the individual repeater which is at the time transmitting toward the hub, must be unlocked for this condition to permit the passage of the signals through its associated sending leg. Marking and spacing signals generated in the receiving leg of the individual repeater which is transmitting toward the hub will operate the sending relay such as 19 in each unlocked leg simultaneously, retransmitting the signals over the connected lines to the distant connected stations.

In order to prevent retransmission of the signals, incoming to the individual repeater which is assumed to be at the moment transmitting toward the hub, back through the sending leg of the same individual repeater from which they are being received, the flip-flop control circuit in that repeater must place a locking condition on its respective triode, such as triode 18, to maintain its associated sending relay such as relay 19 continuously in the marking condition during the entire interval that its own individual receiving leg is receiving and transmitting towards the hub. Such signals impressed from the hub on that particular sending leg will therefore have no effect.

In the event that the sending leg of a particular repeater, which we will call repeater No. 1, has been receiving signals through the hub from the receiving leg of another repeater, which we will call repeater No. 2, not shown, the flip-flop control circuit in repeater No. 1 must be in the unlocked condition to permit the passage of the signals. If repeater No. 2 ceases to transmit signals toward the hub and thereafter repeater No. 1 starts to transmit toward the hub, it is necessary that two control functions be performed. First, it is necessary that the flip-flop control circuit in repeater No. 1 lock its own sending leg in response to the signals generated in its own receiving leg to prevent retransmission of its own signals to its own line. Second, it is necessary that the flip-flop control circuit in repeater No. 2, which repeater was last transmitting and the flip-flop control circuit associated with which repeater was therefore locked, be unlocked so that the signals from the receiving leg of repeater No. 1 may pass freely from the hub through the sending leg of repeater No. 2.

It is to be understood of course for the conditions assumed, that since repeater No. 2 was the last to transmit, its associated flip-flop circuit was the only one which was in the locked condition when repeater No. 1 started to transmit. Therefore, the flip-flop control circuits in all other repeaters will be in the unlocked condition at this time and will be and will remain unaffected when repeater No. 1 starts to transmit.

There is one other functional requirement of the flip-flop control circuit. It must provide for the condition under which, while one receiving leg, say that in repeater No. 1, is transmitting toward the hub, the receiving leg in another repeater, which we will call repeater No. 2, starts to transmit toward the hub. Under such circumstances, since it is impossible to transmit communication signals effectively from more than one individual repeater through the single hub to all of the other sending legs simultaneously, in order that the parties connected to all lines connected into the concentration be made aware of the attempted double transmission, the control circuits are arranged so that they are all unlocked in response to two simultaneous spacing signals transmitted toward the hub. Therefore, the sending relays in all legs, including the sending relays associated with the two receiving legs which are transmitting simultaneously, are operated to the spacing condition. The reception of spacing signals at each of the stations which is simultaneously transmitting serves as an indication of the double transmitting condition since under normal conditions a marking signal exists on the sending leg of a station while it is transmitting.

It will now be assumed that the system has been idle for an interval. Under this condition the flip-flop control circuit in the particular repeater which was the last to transmit toward the hub will be in the locked condition, and the control circuits in all other repeaters in the system will be unlocked. It will be assumed that a particular repeater, say repeater A, not shown, starts to transmit through its receiving branch such as branch 4 toward the hub. The effect of this on all repeaters except repeater A and its control circuit, which will be considered hereinafter, will now be described.

In response to the first spacing signal transmitted from the receiving leg of repeater A toward the hub, the junction 5 and all receiving branches of all repeaters connected to it, including the repeater which last transmitted, are made more negative. The grids of the left-hand triodes of all control circuits in the repeaters other than repeater A are made negative with respect to their cathodes. Their left-hand triodes are therefore all placed in the non-conducting condition. Since no current flows in their output circuits, the junctions 39 are in their more positive condition under which condition the grids of the right-hand triodes are made more positive with respect to their respective cathodes, and the right-hand triodes conduct. When current flows in the output circuits of the right-hand triodes, junctions 45 are made less positive and the upper terminals of dry rectifiers 49 are made so negative with respect to junctions 16 that they become non-conducting. In such condition the flip-flop control circuits have no control over triodes 18 which are then controlled by conditions imposed by the hub on sending legs 14.

As a result of the conduction of the right-hand triodes of double triodes 25 and a consequent lowering of the potential of junctions 35 the potential at junction 30 and the potential applied to the grids of the left-hand triodes are maintained more negative with respect to their cathodes. Rectifiers 32 conduct for this condition. The magnitudes of the resistances and of the battery voltages as well as the characteristics of the double triodes are so chosen that, as communication continues, in response to positive swings due to the succeeding marking conditions on the branches such as 4 of the repeaters under consideration, the negative change in potential due to the conduction of the right-hand triodes is dominant in its effect on the potential impressed between the grids and cathodes of the left-hand sections of double triodes 25. As a result of this, once a control circuit in a repeater is unlocked, in response to the first spacing signal impulse of normal communication signal trains, it remains unlocked, since it is unaffected by any of the marking signal impulses in the communication signal trains. So while communication continues, all of the control circuits in the repeaters other than that in repeater A remain unlocked and the signals transmitted toward the sending hub pass freely through their sending legs.

The manner in which the control circuit in a particular repeater operates to apply a locking condition to its own sending leg when it starts to transmit toward the hub while all other repeaters remain in their marking condition will now be described.

When the armature of the receiving relay such as relay 1 is first actuated to its spacing contact, full negative potential is applied directly to the top terminal of resistance 22. A less negative potential exists at junction 28 which is applied through resistance 31 to the grid of the left-hand triode. The grid of the left-hand triode is therefore more positive than its cathode and the left-hand triode conducts. This in turn cuts off the right-hand triode, making the potential applied through resistance 46 and rectifier 49 sufficiently positive so that the grid of triode 18 is made more positive than its cathode and triode 18 is maintained in the conducting condition in turn maintaining relay 19 in the marking condition.

The spacing signal on the receiving hub causes the potential of junction 30 and of the grid of the left-hand triode to swing sufficiently negative that rectifier 32 ceases to conduct even if the right-hand triode were in a conducting condition at the time the negative swing occurred. Hence the feedback path from the plate of the right-hand triode to the grid of the left-hand triode is effectively opened at this time.

When the armature of relay 1, in the repeater which is assumed to be transmitting toward the hub, returns to the marking condition in response to the marking signal impulses in the communication signal train, the grid of the left-hand triode will be maintained more positive than its cathode so that the locking condition applied to its sending leg will be maintained and the sending leg will be unaffected by communication signal impulses impressed on it from the hub. Therefore communication signals originating in the receiving leg of any repeater cannot be repeated back over its own sending leg.

When the receiving leg of one repeater is transmitting toward the hub and the receiving leg of a second repeater starts to transmit toward the hub also, the hub will be made more negative than when a single spacing signal is impressed on it. Under this condition the potential of the grids of all of the left-hand triodes will be negative with respect to thehir cathodes. This will unlock every control circuit and a spacing signal will be transmitted from the hub over the sending legs of all repeaters in the system including the two which are transmitting simultaneously toward the hub, the sending legs of which two repeaters would ordinarily be in the marking condition if but one were transmitting. This serves as an indication of the attempted double transmission.

Attention is particularly directed to the function performed by the dry rectifier 32. If rectifier 32 were not used, the ratio of the resistances coupling the grid of the left-hand triode of double triode 25 to the receiving hub and to the plate of the right-hand triode would be required to be such as to produce a maximum voltage swing at the grid of the left-hand triode when:

1. The right-hand triode changes from the locked to the unlocked condition with a marking signal on the receiving hub;

2. The right-hand triode changes from the unlocked to the locked condition with the receiving hub changing simultaneously from the space to the double space condition.

As the resistance ratio is changed, one of these swings will increase and the other decrease. Hence the maximum swing would be obtained at a resistance ratio making the two swings equal. The magnitude of the maximum swing obtainable would, however, be too small to be practicable for overriding voltage and resistance variations.

When the rectifier 32 is employed, it presents a low resistance during the marking condition on the receiving hub. The resistance ratio is then such as to place the voltage applied to the grid of the left-hand triode close to that of the plate of the right-hand triode so that it is greatly affected by the plate swing. When the receiving hub is in the space or double-space condition rectifier 32 presents a high resistance, thus effectively changing the grid of the left-hand triode so that it is more directly influenced by the voltage swing of the receiving hub for the space and double-space conditions. As a result of this, the voltage swing obtainable at the grid of the left-hand triode may be increased about two-fold over that obtainable without rectifier 32.

Figure 2:
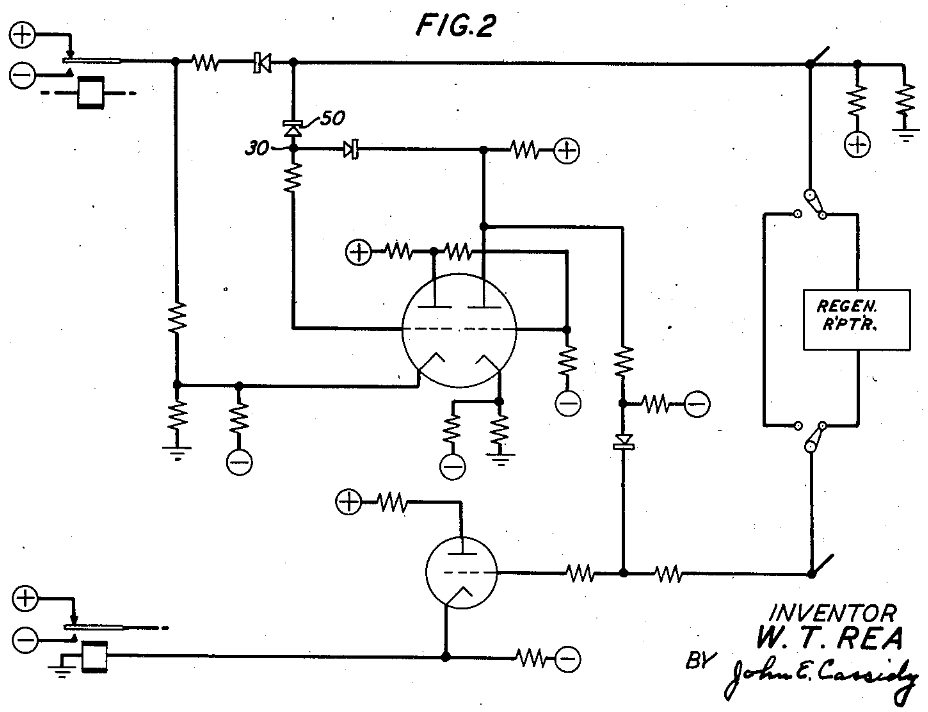
Fig. 2 shows a second control circuit, a modification of that of Fig. 1 which also will serve satisfactorily in the arrangement per Fig. 3 and with modifications in the arrangement per Fig. 4.

Tube 25 in Figs. 1 and 2 may be, for instance a Western Electric Company, Incorporated, Code 396A tube. The positive and negative potentials indicated in Figs. 1 and 2 in a representative case may be 120 volts, respectively, in each instance.

The following is a representative and operable set of resistance values for the arrangements per Fig. 1 and Fig. 2.

| Resistance Number | Resistance Magnitude |
|---|---|
| 2 | 2,000 ohms. |
| 8 | 18,000 ohms. |
| 9 | 18,000 ohms. |
| 15 | 2 megohms. |
| 17 | 2 megohms. |
| 20 | 17,000 ohms. |
| 21 | 2,500 ohms. |
| 22 | 6,000 ohms. |
| 23 | 6,400 ohms. |
| 24 | 32,000 ohms. |
| 31 | 2 megohms. |
| 36 | 0.2 megohm. |
| 38 | 0.5 megohm. |
| 40 | 3.2 megohms. |
| 41 | 2.4 megohms. |
| 42 | 2,800 ohms. |
| 43 | 7,100 ohms. |
| 46 | .56 megohm. |
| 48 | 1.6 megohms. |

Refer now to Fig. 2. In this control circuit the principle of the increased voltage swing obtainable through the incorporation of a dry rectifier in the interconnection of the feedback and grid circuits of one of the tubes of a flip-flop control circuit is further extended by the addition of the dry rectifier 50. The dry rectifier 50 is so poled as to present a high resistance when positive battery is applied to the receiving hub for the marking condition and a low resistance for the space and double-space condition. By this means the grid of the left-hand triode is in effect moved very near to the receiving hub for the latter condition. Thus a further improvement in the magnitude of the grid swing results.

Assuming the resistance and potential values of the foregoing as a representative operable set, the following table shows the potentials indicated for the various conditions in Fig. 2.

*Voltage conditions in Fig. 2*

| | | Column | | | | | | | |
|---|---|---|---|---|---|---|---|---|---|
| | | I | II | III | IV | V | VI | VII | VIII |
| Relay 1 | | M | M | M | M | S | S | S | S |
| Rec Hub | | M | S | S | M | S | S | DS | DS |
| Condition of locking circuit | | Held | Held | Rls'd | Rls'd | Rls'd | Held | Held | Rls'd |
| Terminal 26 | | +120 | +120 | +120 | +120 | −120 | −120 | −120 | −120 |
| Terminals 28 and 5 | | +60 | −30 | −30 | +60 | −30 | −30 | −60 | −60 |
| Left-hand triode of 25 | Cathode | +17 | +15 | +15 | +15 | −43 | −43 | −45 | −45 |
| | Terminal 30 | +60 | −30 | −30 | 0 | −30 | −30 | −60 | −60 |
| | Terminal 39 | +47 | +100 | +100 | +100 | −11 | −11 | +100 | +100 |
| Right-hand triode of 25 | Cathode | −34 | −34 | −33 | −33 | −33 | −34 | −34 | −33 |
| | Grid | −49 | −26 | −26 | −26 | −74 | −74 | −26 | −26 |
| | Terminal 35 | +100 | +100 | 0 | 0 | 0 | +100 | +100 | 0 |
| Terminal 47 | | +46 | +46 | −30 | −30 | −30 | +46 | +46 | −30 |

[1] Denotes unstable condition.

In the foregoing table column I shows the conditions that exist when relay 1 is marking, the hub is marking and the locking circuit is held. When the hub goes spacing the instaneous conditions become as shown in column II. It will be noted that these are unstable, since, although the locking circuit is assumed held, the grid voltage of the right-hand triode with respect to its cathode is positive. The circuit, therefore, changes instantly to the stable condition shown in column III with the locking circuit released.

Column IV shows the conditions that exist when relay 1 is marking, the hub is marking and the locking circuit is released. When relay 1 goes spacing the instantaneous conditions become as shown in column V. It will be noted that these are unstable, since although the locking circuit is assumed released, the grid voltage of the right-hand triode with respect to its cathode is negative. The circuit, therefore, changes instantly to the stable condition shown in column VI with the locking circuit held.

When now some other receiving leg becomes spacing, the hub will assume the double-space condition and the instantaneous conditions will become as shown in column VII. This condition is unstable because although the locking circuit is assumed held, the grid voltage of the right-hand triode with respect to its cathode is positive. The circuit, therefore, changes instantly to the stable condition shown in column VIII with the locking circuit released.

The minimum grid-to-cathode potential swings afforded by the arrangement of Fig. 1 in which the single rectifier is employed is an improvement over a circuit which does not employ the rectifier. The minimum grid-to-cathode potential swings afforded by the arrangement of Fig. 2 employing two rectifiers, as indicated by the above table, are substantial and represent a further improvement over that obtainable by the arrangement in Fig. 1.

Refer now to Fig. 3 which shows two repeater and control circuits identical with that of Fig. 2 herein, except that the hub potentiometer is replaced by a single resistance RH, connected from a positive battery of relatively low potential to the hub. It is to be understood that when a half-duplex concentration is to be formed a number of other such repeaters are joined to the same hub in the same manner. This is indicated by the spur or strap extending from the receiving hub RH, and the sending hub SH. When such a half-duplex concentration is formed it is operative when hubs RH and SH are joined directly through the strap 10 or through the regenerative repeater 11. However, when the two repeater and control circuits are connected to form a full-duplex circuit no other repeater and control circuits may be connected and the arrangement is operative only when a regenerative repeater is not employed.

The manner in which the half-duplex concentration operates should be apparent from the foregoing description of the operation of the arrangements of Figs. 1 and 2.

For a full-duplex circuit in which two repeater and control circuits are coupled together attention is called to the fact that when a single spacing signal is generated either by relay WR or ER the corresponding sending leg is locked and the spacing signal passes freely through the opposite sending leg.

As explained in the description of the operation of the circuit per Fig. 1 and Fig. 2 in the foregoing, when two spacing signals or portions of them exist on the hub simultaneously, both control circuits are unlocked to transmit spacing signals back to the stations at which they are originating. In that case the reception of the spacing signals when the incoming circuit should be maintained in the marking condition serves as an indication of an abnormal condition, namely the attempted transmission of a plurality of signals simultaneously through a half-duplex hub concentration comprising more than two circuits which would cause mutilation of the signal elements. In the present full-duplex arrangement however when only two circuits are interconnected and when no regenerative repeater is employed there can be no mutilation and the received signals can be effectively employed for communication.

The overlapping of portions of signal elements causes no difficulty as can be understood from the following.

Let it be assumed that the system is marking and that the west receive relay last transmitted toward the hub. The west control circuit is locked so that the west send relay is held marking. The east control circuit is unlocked so that the signals which originated in the west leg might pass freely through the east sending leg. Now let it be assumed that the east receiving relay receives a spacing signal element. This locks the east control circuit and the east sending leg. It unlocks the west control circuit and the west sending leg and it will be assumed that the signal is passing through the west sending leg. While this condition exists and after the first portion of the signal has been transmitted through the west leg let it be assumed that a spacing signal is received by the west receive relay WR. This produces the double-space condition which effects the opening of both sending legs. The west leg is already open and it remains open. The locked east sending leg is opened so that a spacing signal element will exist on both sending legs. After the termination of the reception of the spacing signal element by the east receive relay ER the double-space condition will be terminated. A single-space condition will exist in response to the latter portion of the still incoming spacing signal element from the west receive relay WR. The west control circuit will function to lock the west send leg. The east control circuit will remain unlocked while the latter portion of the spacing signal incoming from relay WR passes through the east sending leg.

It is not possible to operate full duplex with the circuit arrangement of Fig. 3 when a regenerator is employed because of the delay introduced by the regenerative repeater. The control circuits function almost instantaneously to apply or remove their holds in response to the single or double space conditions appearing on the receiving hub. Also a single regenerator cannot simultaneously regenerate two uncorrelated trains of signals.

If for instance a spacing signal element is received by the east receiving relay ER the east control circuit functions immediately to lock the east send leg. The west control circuit functions immediately to unlock the west sending leg. The signal in passing through the regenerative repeater is delayed for an interval equal in duration to the duration of one-half a signal element so that the best portion of the incoming signal may be sensed. Then the regenerative repeater is locked in the determined condition for the duration of a full signal element. This signal element is passed on to the west sending leg.

Now let it be assumed that while this single-space condition exists and about the time that the spacing signal received from the east appears on the west sending leg, a spacing signal is received by the west receive relay. A double-space condition will exist on the receiving hub. Both control circuits will be unlocked. The latter portion of the spacing signal incoming from the east will be properly directed to the west and will also be misdirected to the east from which it originated followed by the spacing signal from the west which will exist for a normal interval. The spacing signal received by the east will be unduly lengthened assuming that the signals overlap.

The arrangement per Fig. 4 is operable when two repeater and control circuits are interconnected to form a full-duplex circuit whether or not a regenerative repeater is employed.

Refer now to Fig. 4. In the arrangement per Fig. 4, the connections for the half-duplex concentration and for the two circuit full-duplex system differ and switches SW1, SW2, SW3 and SW4 are provided to effect the change. The switches may take a number of forms, including jacks and plugs, but are illustrated in their simplest form as two-position manually operable key switches. These switches when in the positions shown in Fig. 4 interconnect their respective repeater and control circuits into a half-duplex concentration which may be comprised of three or more repeater and control circuits. The receiving hub RH and the sending hub SH may be interconnected directly or through a regenerator and the half-duplex concentration will operate in the manner described for the operation of Figs. 1 and 2 and the half-duplex concentration per Fig. 3.

When the switches SW1, SW2, SW3 and SW4 per Fig. 4 are in their alternate positions, a full duplex system interconnecting two repeater and control circuits only is established and the system is operable whether or not regenerative repeaters are employed. It will be observed that the connections for the full-duplex system per Fig. 4 differ from those of the half-duplex concentration per Fig. 4 in a number of respects. First, in the full-duplex arrangement there is no single common hub. Second, the receiving leg in each control circuit in the full duplex arrangement is connected to the sending leg of the other control circuit. Third, in the full duplex arrangement, when required, a regenerative repeater is inserted in each individual interconnection between the legs of the two repeaters, so that a single regenerator cannot serve the system as in the half-duplex concentration arrangement per Fig. 4.

However, the most important difference between the half-duplex concentration and the full-duplex arrangement of Fig. 4 is that in the full duplex arrangement a resistance $R_1$ is connected from the receiving hub potential source to what corresponds to the receiving hub, and will be called hereinafter the receiving vertex, and a second resistance $R_2$ has one terminal connected directly to the receiving vertex and a second terminal connected directly to the receiving leg in each of the two circuits so as to form a potentiometer at the receiving vertex in each of the two circuits, which circuits are to be joined to form the full-duplex system. The magnitudes of these resistance elements of the potentiometer in the full-duplex arrangement per Fig. 4 are so chosen in relation to the magnitude of the hub resistance element $R_H$ of the half-duplex concentration of Fig. 4 and in relation to the resistance $R_R$ of the receiving leg, common to both the half-duplex and full-duplex arrangements, and to the applied potentials, that when two circuits are interconnected to form a full-duplex system per Fig. 4 and a single one of them transmits a signal toward its respective receiving vertex, the magnitudes of the potentials applied to the control circuit connected to its receiving leg are substantially the same as the magnitudes of the potentials applied to a control circuit in a half-duplex concentration for a double-space condition. In response to this the sending leg associated with a first, say west, repeater, the receiving leg of which is transmitting towards its receiving vertex, is unlocked so that if a signal is received simultaneously through the receiving leg of the east repeater it will pass through the sending leg of the west repeater.

Normally or for the marking condition of both the east and west repeaters there is no hold applied to either sending leg so that a spacing signal originating in either will pass freely through the sending leg of the other. As normally arranged, however, for half-duplex operation a control circuit in a particular repeater locks its individual sending leg when its individual receiving leg transmits a signal toward the hub to prevent the transmission of the received signal back to its source. There is no possibility of this misdirection of signals in the full-duplex arrangement per Fig. 4 as the receiving leg of a particular repeater is separated from the sending leg of the same repeater since there is no single common hub to which each is connected. The complete separation of the receiving and sending legs of each repeater permits the conditioning of the control circuit so that the sending leg of a repeater is never locked. It is unlocked for a marking condition as explained. It is unlocked instead of locked in response to a single space so that it is in condition at all times to pass signals incoming from the opposite repeater. Further the complete separation of the sending and receiving legs in each individual repeater and maintaining the sending legs always unlocked makes it possible to insert a regenerative repeater in either connection between the receiving and sending legs for full-duplex operation.

To effect this, as mentioned, each single space is disguised as a double space by producing a double-space voltage condition on the hub to deceive the connected control circuit. As a result of this deception, the full-duplex arrangement per Fig. 4 has been aptly named, in the art, the hoodwink circuit.

The relationship of the resistance values to produce the double-space potential condition in response to a single space in the full-duplex arrangement per Fig. 4 are as follows.

It is assumed that the potentials of the potential sources in each system are the same. Then it is required that $$R_1=R_H\frac{R_R+2R_H}{R_R+R_H}$$

$$R_2=\frac{R_RR_H}{R_R+R_H}$$

From the foregoing:

$$R_1+R_2=2R_H$$

What is claimed is:

1. A hub telegraph repeater having a receiving leg and a sending leg, a control circuit interconnecting said legs for locking and unlocking said sending leg in response to signaling conditions impressed on said receiving leg, a first half-duplex hub concentration termination for said repeater and control circuit, a second full-duplex termination for said repeater and control circuit and a switch intermediate said repeater and control circuit and said first termination and said second termination, to permit the connection of said repeater and control circuit to said first termination or to said second termination.

2. A telegraph repeater and control circuit, a first half-duplex hub concentration termination, a second full-duplex termination, a switch for interconnecting said repeater and control circuit to said first or said second terminations, a double-space control in said control circuit, said double-space control responsive to the imposition of plural space conditions on said first termination when said control circuit is connected to said first termination, and resistance elements in said second termination for producing a condition corresponding to said double-space condition of said first termination in response to the imposition on said second termination of a single-space condition.

3. In a telegraph system, a first telegraph repeater and control circuit, a second telegraph repeater and control circuit, an individual receiving leg and an individual sending leg in each of said repeaters, a first connection from the receiving leg of said first to the sending leg of said second and a second connection from the receiving leg of said second to the sending leg of said first repeater and control circuits, a first and a second potentiometer, said first potentiometer comprising a first resistance element connected in series with said receiving leg of said first repeater and to said first connection, and a second resistance element connected between the junction of said first resistance element and said first connection and a source of potential, said second potentiometer comprising a third resistance element connected in series with said receiving leg of said second repeater and to said second connection and a fourth resistance element connected between the junction of said third resistance element and said second connection and a source of potential.

4. A system in accordance with claim 3 having a first regenerative repeater in said first connection and a second regenerative repeater in said second connection.

5. In a telegraph system, a telegraph repeater having a receiving leg and a sending leg, a first and a second termination, a switch, said switch operable to connect said repeater to said first or to said second termination, a control circuit comprising a potential-discriminating device connecting said legs, an input circuit for said device including potentiometers for discriminating between a first and second potential condition when a first or a second signal condition is imposed on said control circuit when said repeater circuit is connected through said switch to said first termination, and potentiometer means in said second termination for actuating said control circuit as for said second signal condition by producing said second potential condition in response to the imposition of said first signal condition when said repeater is connected through said switch to said second termination.

6. In a telegraph system, a first repeater, a first control circuit connected to said repeater, a first switch, a first and a second termination selectively connectable to said repeater through said switch, a second repeater, a second control circuit connected to said second repeater, a second switch, a third termination, said first or said third termination selectively connectable to said second repeater through said second switch, said first and said second repeaters connectable through each of said terminations, potential and first resistance means for impressing a first potential and a second potential, substantially different from said first potential, on said control circuits in response to a single-space signal condition and a double-space signal condition, respectively, imposed on said first termination, when said repeaters are connected through said switches to said first termination and potential and second resistance means for impressing said second potential on said first or said second control circuit in response to a single-space signal condition imposed on said second or said third termination, respectively, when said repeaters are connected through said switches to said second and said third terminations.

7. In a telegraph system, in combination, a first and a second hub-type repeater each having an individual receiving leg and an individual sending leg and interconnected between said legs an individual potential-discriminating control circuit, said control circuits each having a double space feature, said feature comprising space discharge devices discriminating between potentials applied thereto for a single space and a double space signaling condition, said repeaters interconnected through a single common hub to provide a two-circuit two-legged full-duplex system.

8. In a telegraph system, two telegraph repeaters interconnected to form a full-duplex system, said repeaters each having an individual receiving leg and an individual sending leg, the receiving leg of each of said repeaters connected to the sending leg of the other of said repeaters, a potential-discriminating control circuit connected individually between the receiving leg and sending leg of each repeater, and an individual potentiometer connected to each junction between each receiving leg and the connection to said other sending leg, each of said potentiometers having a first resistance element in series with its respective receiving leg and a second resistance element connected to a source of potential.

9. In a telegraph system, two telegraph repeaters interconnected to form a full-duplex system, said repeaters each having an individual receiving leg and an individual sending leg, the receiving leg of each of said repeaters connected to the sending leg of the other of said repeaters, a potential-discriminating directional control circuit connected individually between the receiving leg and sending leg of each repeater, and means operable over said receiving leg for preventing said control circuit from exercising its directional function.

WILTON T. REA.

REFERENCES CITED

The following references are of record in the file of this patent:

UNITED STATES PATENTS

| Number | Name | Date |
|---|---|---|
| 1,509,886 | Vernam | Sept. 30, 1924 |
| 2,228,890 | Singer | Jan. 14, 1941 |

FOREIGN PATENTS

| Number | Country | Date |
|---|---|---|
| 531,902 | Great Britain | Jan. 14, 1941 |